March 26, 1963 H. R. HAWKES 3,082,909
ARTICLE FEEDING APPARATUS

Filed Nov. 23, 1959 3 Sheets-Sheet 3

INVENTOR.
HAROLD R. HAWKES

BY Elmer J. Nealon

ATTORNEY.

3,082,909
Patented Mar. 26, 1963

3,082,909
ARTICLE FEEDING APPARATUS
Harold R. Hawkes, Lynnfield, Mass., assignor to Sylvania Electric Products Inc., a corporation of Delaware
Filed Nov. 23, 1959, Ser. No. 854,975
4 Claims. (Cl. 221—11)

This invention relates to article feeding apparatus and more particularly to apparatus for holding small, individual articles arranged in a plurality of batch associations and presenting them at a delivery location one at a time.

In the manufacture of small devices particularly small electrical translating devices such as, for example, semiconductor diodes the parts or elements of each device are generally fabricated and assembled on a series of automatic or semiautomatic equipments. These equipments are generally of the line processing type. That is, each element in sequence is carried in one of a series of receptacles through a series of processing or fabricating stations on a piece of equipment and is then presented at a delivery station where the resulting article is automatically removed from the equipment. Because of the small size of individual elements and the ease of transporting them in batches containing very large quantities of elements, it is generally not considered economically feasible to provide for automatic transfer of articles from one piece of equipment to the next in the series. In addition, the output rates of the various equipments are frequently not perfectly balanced, thus making direct transfer impractical. Also, although the automatic equipment employed may be of the line processing type, it may be desirable, or essential, to perform certain operations intermediate the automatic processes on articles arranged in batches. Thus, the individual articles generally are collected as they leave a piece of equipment at the delivery station until a lot of suitable size has been formed, and the lot is then carried to the next piece of equipment in the series either directly or subsequent to a batch process operation.

The handling of articles in this manner requires apparatus for holding or storing batches of articles and for feeding the articles one at a time to a delivery location for loading into the receptacles on a piece of line processing equipment. It is desirable that such storage and feeding apparatus be adapted to supply the articles without interruption to the next piece of processing equipment even though the articles are supplied to the apparatus in batches or lots. The well-known vibratory bowl type feeder is widely used for feeding small parts such as those employed in the fabrication of small electrical translating devices. However, for the holding and conveying of parts which are fragile and susceptible to damage from agitation or abrasion, or are of such configuration as to become entangled with each other, this type of feeding apparatus may be unsatisfactory. Other types of apparatus in which small articles are suitably arranged in an orderly manner in order to prevent such damage may not feed as well as desired because of jamming and binding the articles with each other and with portions of the apparatus along which they are being fed.

Therefore, it is an object of the present invention to provide improved apparatus for feeding articles from a batch arrangement to a delivery location one at a time.

It is a more specific object of the invention to provide automatic apparatus for feeding articles from each of a plurality of batch arrangements of the articles in sequence and presenting them one at a time at a delivery location for loading into each of a series of receptacles which are positioned in sequence at the delivery location.

It is also an object of the invention to provide an improved method and apparatus for moving small, fragile articles along a path without jamming or binding the articles.

Briefly, in accordance with the objects of the invention a plurality of mounting racks each having a quantity of articles disposed thereon are positioned in sequence adjacent one end of a track. Articles are moved off the rack and along the track. An escapement mechanism on the track permits only one article at a time to leave the track at a delivery location. A detecting means located along the track senses when less than a predetermined number of articles are on the track and activates an indexing means causing the rack adjacent the one end of the track to be removed and replaced by the next rack in the sequence. The articles are moved along the rack onto the track by the combination of a steady stream of air and an intermittent stream of air, both of which are directed along the direction of the path of movement of the articles.

Additional objects, features, and advantages of the present invention will become apparent from the following detailed discussion and the accompanying drawings wherein FIG. 1 is a plan view with portions broken away showing apparatus according to the invention for feeding an element or component of a semiconductor diode for loading into individual receptacles on a piece of processing or fabricating equipment;

Figure 1:
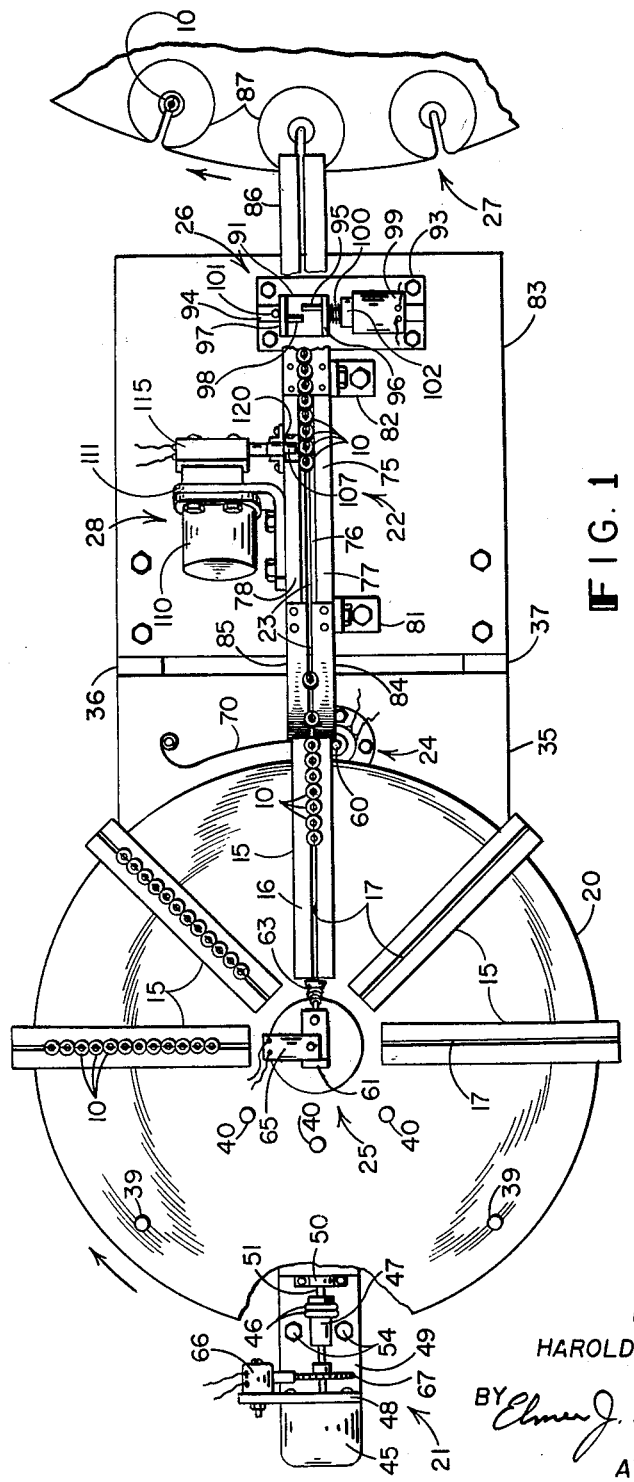
Figure 2:
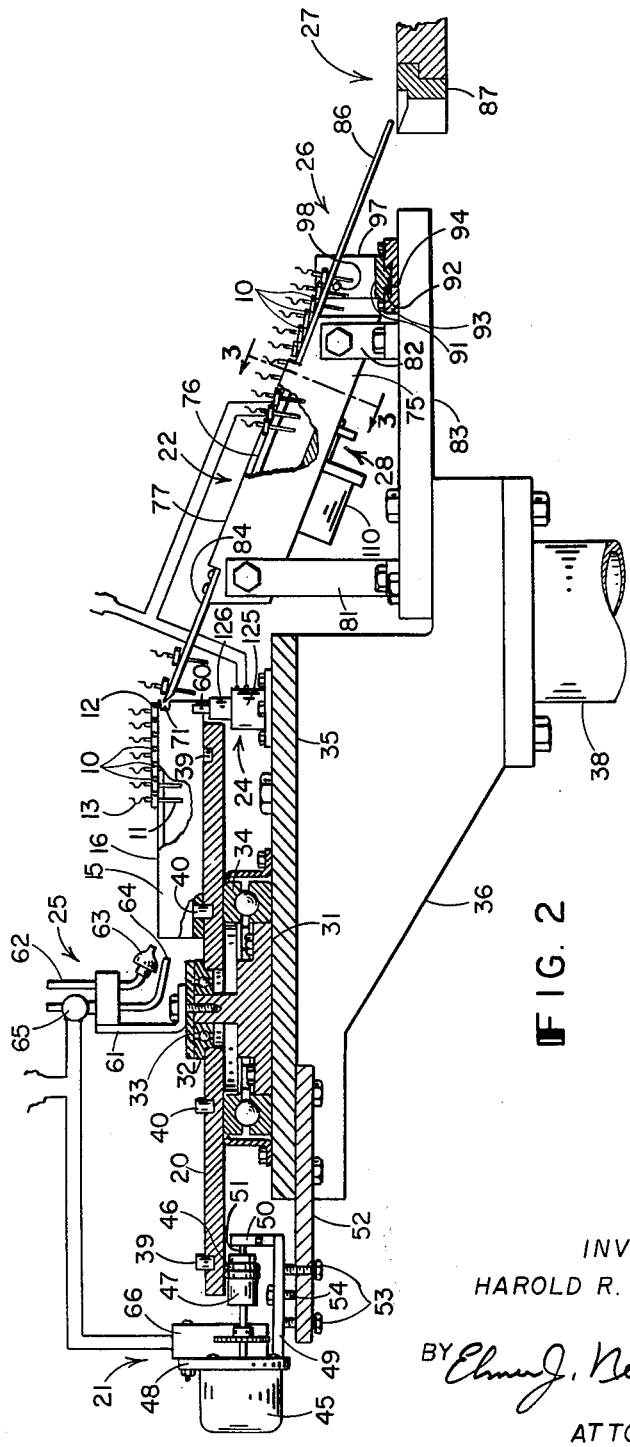
FIG. 2 is a side view partially in cross section of the apparatus of FIG. 1.
Figure 4:
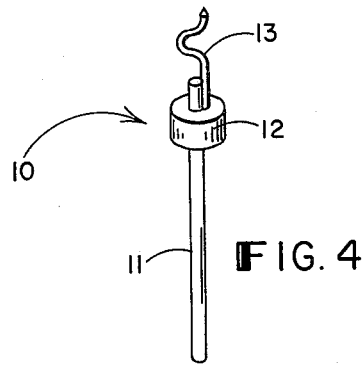
FIG. 4 is a perspective view of the element of a semiconductor diode which the apparatus as shown and described is adapted to feed.

The semiconductor diode elements 10, one of which is shown in detail in FIG. 4, include a lead wire 11 of a suitable metal sealed through a glass bead 12. An appropriately formed cat whisker or contact element 13 as of tungsten is welded to the lead. A quantity of these elements are arranged in line in a tray or mounting rack 15 for holding or supporting the articles as shown in FIGS. 1 and 2. The elements may be placed in the rack by a suitable apparatus as they leave the equipment which fabricates the elements from the lead wire, glass beads and whisker wire. Electrolytic pointing techniques are employed to point the whiskers of all elements in the rack in a batch type operation. The elements in the rack are then ready to be loaded individually into the next piece of line processing equipment.

In the mounting rack the bottom surfaces of the glass beads rest on the upper surface 16 of the rack and the leads hang through an opening or slot 17 in that surface which extends along the length of the rack. Racks containing the elements are removably mounted on the surface of a rotary table 20. The table is rotated by a driving mechanism 21 to bring a rack into position adjacent one end of an inclined track 22 having a slot 23 therein which registers with the slot in the rack. As the rack reaches this position a latch unit 24 stops it and prevents further rotation of the table. An air unloading device 25 moves the elements along the rack and onto the track where they move under the force of gravity to an escapement mechanism 26 which blocks further movement of elements along the track. The escapement mechanism is activated by a signal from the processing equipment 27 to be loaded so as to permit one element to be placed in a receptacle 87 on the equipment each time the equipment indexes to present an empty receptacle adjacent the end of the track. A sensing unit 28 periodically checks the track in order to determine whether or not elements extend up the track from the escapement mechanism to the sensing unit. When no element is detected, the sensing unit causes the latch unit 24 to be momentarily actuated permitting the driving mechanism 21 to rotate the table and move the rack out of position. The next rack in sequence moves into position adjacent the end of the track 22, is stopped by the latch unit, and immediately is unloaded onto the track by the air unloading device 25.

The rotary table 20 rotates about a pivot block 31 on pivot bearings 32. A retaining washer 33 bolted to the pivot block holds the table on support bearings 34. The pivot block and support bearings are supported on a mounting platform 35. The platform is secured to brackets 36 and 37 which are bolted to a stanchion 38. Two sets of locating dowels 39 and 40 extending above the surface of the table serve to position the racks on the table by means of mating recesses in the bottoms of the racks.

The table is rotated by the driving mechanism 21 which consists primarily of an electric motor 45 for rotating a set of rubber driving wheels 46 through a slip clutch arrangement 47. The motor is attached to a mounting plate 48 fastened to one end of a bracket 49, and a bearing block 50 at the other end of the bracket supports the end of the shaft 51 extending from the slip clutch. The bracket is adjustably mounted on a plate 52 which is rigidly bolted to the main mounting platform. Three lower screws 53 (only two of which can be seen in the figures) are threaded into the plate and provide three-point support for the bracket. Two upper screws 54 pass through holes in the bracket and are threaded into the plate so as to hold the bracket firmly in place against each of the three lower screws. Manipulation of the screws adjusts the height and inclination of the bracket so that the proper force of contact between the driving wheels and the underside of the rotary table may be obtained for driving the table. The slip clutch is adjusted so as to permit the table to be driven by the motor, but to slip without overloading the motor whenever rotation of the table is prevented. Rotation of the table is stopped when a rack properly held in position by the locating dowels comes into contact with the stop pin 60 of the latch unit 24.

When a rack 15 is stopped against the stop pin, its outer end is adjacent the end of the track 22, and the slots in the rack and the track line up to provide a continuous channel for the diode elements to move along. The elements are moved off the rack and onto the track by the air unloading device 25 located adjacent the inner end of the rack. The unloading device is rigidly held in position by a bracket 61 bolted to the pivot block 31. A continuous stream of air passes through an air line 62 and is applied through a fan-shaped nozzle 63 to the portion of the elements extending above the top surface of the rack. A pulsating stream of air is applied to the portion of the elements below the top surface of the rack through an air line 64. This air stream is interrupted by the action of a solenoid valve 65 placed in the air line. Operation of the solenoid is accomplished by the closing and opening of a switch 66 in the electrical circuit of the solenoid. The switch is fastened to the mounting plate 48 of the rotary table drive motor, and is opened and closed periodically by a switching cam 67 mounted on the drive motor shaft. Both air streams are directed against the last element in line and along the direction of movement of the elements. The air jets impart a rocking motion to the elements while at the same time providing a steady force along the direction of movement. This combination of actions prevents the elements from jamming or binding in the slot and provides rapid unloading from the rack and onto the inclined track for all the elements in the line. Since the air streams remain on during the rotation of the table, a retaining wire 70 is arranged so as to engage a groove 71 in the outer end of the rack from a point outside of the region of influence of the air streams to the inclined track. Thus, unloading of elements from the rack is prevented until the slot 17 in the rack is in register with the slot 23 in the track.

The track 22 includes a central section 75 having an inclined surface 76 on which the glass beads of the elements are supported and a slot 23 along its length for permitting the leads to hang freely. Two walls 77 and 78 extend above the inclined surface 76. These walls are parallel with the slot and there is sufficient distance between them to receive the glass beads. Supports 81 and 82 fasten the central section of the track to a plate 83 which is bolted to the brackets 36 and 37. An upper extension from the central section of the track consists of two flat plates 84 and 85 bolted to the central section and defining a further portion of the slot 23. One end of the extension protrudes into the groove 71 in the rack as the rack moves into position adjacent the end of the track. A similar extension 86 of the track leads from the other end of the central section to the equipment 27 into which the elements are to be loaded. This equipment includes a plurality of receptacles or carriers 87 each adapted for receiving and holding an element. The equipment periodically indexes, thus placing each of the receptacles in sequence in position adjacent the end of the track. One element is permitted to leave the track and enter a receptacle for each index of the equipment by the escapement mechanism 26.

The escapement mechanism includes a generally U-shaped slide member 91 having a flared extension 92 which mates with an undercut slot 94 in a block 93. The block is firmly bolted to the plate 83 and the slide member is free to move transversely of the track. A first pin 95 extends from near the upper portion of the first of the vertical arms 96 of the slide member toward the second vertical arm 97. A second pin 98 similarly extends from the second vertical arm toward the first. The pins are spaced apart slightly less than the distance between the elements on the track. The slide is attached to a solenoid 99, and a compression spring 100 biases the slide in the direction away from the solenoid. When the slide is in the normal position biased away from the solenoid, the first pin 95 extends across the slot in the track and thus prevents elements from proceeding farther along the track. The second pin 98 with the slide in this position terminates just short of the slot.

After the equipment 27 indexes and positions a receptacle 87 adjacent the end of the track, a pulse is supplied from suitable apparatus associated with the equipment (not shown) to activate the solenoid 99. As the slide 91 is moved toward the solenoid 99, the second pin 98 moves between the leads of the first and second elements in the line of elements. As the movement of the slide continues, the first pin 95 moves clear of the slot permitting the first element to travel off the track and into the receptacle. The second pin 98 blocks movement of the remaining elements along the track. Movement of the slide is limited by the shoulder 102 on the solenoid. After the pulse to the solenoid has terminated, the spring 100 causes the slide to return to its original position against a stop pin 101. During this action the first pin 95 moves into position across the slot before the second pin 98 has completely moved clear of the slot. As the second pin 98 clears the slot, the line of elements moves along the track until blocked by the first pin 95. Thus, only one element is placed in a receptacle for each index of the equipment.

Figure 3:
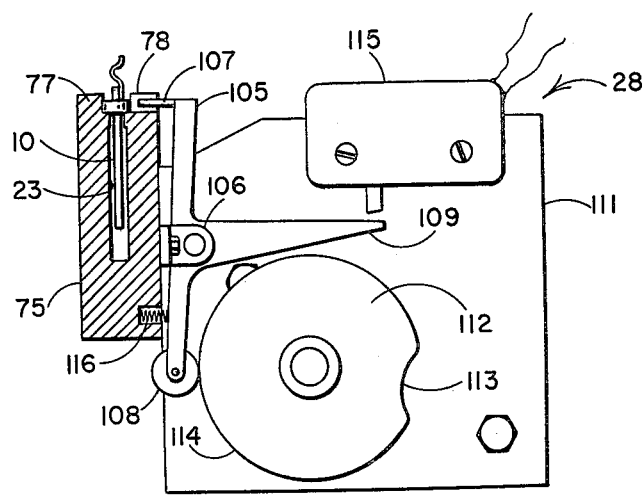
FIG. 3 is a view partially in cross-section of a portion of the apparatus taken along line 3—3 of FIG. 2.

After the elements have been moved from a rack onto the track, the rack remains in position until another rack of elements is required. The sensing unit 28 which is shown in FIG. 3 as well as FIGS. 1 and 2, periodically checks the track; and if a predetermined number of elements are not on the track, a new rack is moved into position and unloaded onto the track. The sensing unit includes a lever arm 105 pivotally mounted in a bearing 106 which is attached to the side of the central section of the track. A feeler arm or finger 107 is attached to the upper end of the lever arm, and a cam follower 108 is attached to the lower end. A lateral extension 109 of the lever arm extends outward from near the region of pivoting. An electric motor 110 (not visible in FIG. 3) which is attached to the side of the track by means of a bracket 111 rotates a circular cam 112 having a single indentation 113 on the cam surface 114. A switch 115 is also mounted on the bracket. The cam follower 108 on the lever arm is biased against the cam surface by a compression spring 116. The cam surface maintains the feeler arm 107 in the position shown in FIG. 3 until the depression in the cam surface reaches the cam follower. The spring then biases the feeler arm forward across the track through an opening 120 in the wall 78. If elements are located on the track at this point, the movement of the feeler is limited by such elements which are pushed against the wall 77 of the track by the pressure of the feeler arm. However, if no elements are present at this point, the cam follower makes the full travel into the recess on the cam as the feeler arm moves freely across the track. The end of the extension arm 109 is thereby raised sufficiently high to close the switch 115 during the time that the cam follower is in the recess.

Closing of the switch 115 completes an electrical circuit to the solenoid 125 of the latch unit 24. The latch unit includes the stop pin 60 which is maintained in position to intercept racks mounted on the rotary table by a compression spring (not shown) within the collar 126. Activation of the solenoid by the closing of the switch 115 retracts the stop pin below the surface of the table, thus permitting the drive mechanism 21 to rotate the table. The stop pin returns to its normal position, as shown, as soon as the rack has cleared the stop pin and the switch 115 has been opened by the action of the cam 112. As the next rack on the table comes into contact with the stop pin, it stops the table and the clutch 47 slips. The elements on this rack are then unloaded onto the track by the air unloader 25. Each rack in sequence is thus similarly unloaded as elements are required. Empty racks are manually removed from the table and replaced with racks holding elements.

The sensing unit together with the latch unit and driving mechanism provides for elements from a new rack to be placed on the track so as to insure that an element will be available at the escapement mechanism for each index of the equipment being loaded. The feeler arm of the sensing unit is located at a sufficient distance from the escapement mechanism and the frequency of sensing is sufficient to insure that the elements on the track will not be depleted until the supply is replenished by the next rack in the sequence. However, the frequency of sensing must be low enough to permit the drive mechanism to rotate a new rack into position and the air unloader to unload enough elements to extend beyond the feeler arm before the next sensing takes place. Also, the feeler arm desirably may be located along the track at a distance from the end of the track adjacent the rack greater than the length of the rack so that all of the elements on the rack are unloaded onto the track at once.

In the figures various portions of the diode elements are shown out of proportion to the apparatus and to each other for purposes of clarity. Apparatus as shown has been employed in the feeding of diode elements generally similar to the one shown in FIG. 4 and having dimensions as follows. The lead wire was .020 inch in diameter with an overall length of 1.2 inches. The glass bead was .050 inch in diameter and .060 inch high. The bottom of the bead was .1 inch below the top of the lead. The pointed whisker of 3.5 mil tungsten wire extended about .070 inch above the top of the glass bead. Racks containing 100 of these elements were readily unloaded and the elements were transferred onto the track by the air unloading device without jamming or breaking the elements or damaging the delicate whiskers. The air pressure in each of the air lines was about 2.5 pounds per square inch. The intermittent air stream was interrupted about 120 times per minute with the air on about 25% of the time and off about 75% of the time.

Although the apparatus as shown and described herein has been adapted in various particulars for the handling and feeding of a specific article, modification of the apparatus for the handling of other articles is obviously possible within the teachings of the present invention.

What is claimed is:

1. Apparatus for feeding articles from a plurality of batch arrangements of the articles to a delivery location one at a time including a plurality of racks each adapted to hold a batch of said articles, carrying means movably supporting said racks, a track defining a path of movement for said articles having one end adjacent the carrying means and its other end adjacent said delivery location, latch means for maintaining one of said racks in registration with said one end of the track, conveying means for moving the articles off said one rack and in single file along said track, an escapement means arranged to permit articles to be conveyed to the delivery location one at a time, detecting means for periodically determining the presence of more or less than a predetermined number of articles located on said track and actuating means responsive to said detecting means for momentarily deactivating said latch means and permitting said carrying means to remove the one of said racks from registration with the one end of the track and move another of said racks into registration with said one end.

2. Apparatus for feeding articles from a plurality of batch arrangements to a delivery location in sequence including a plurality of racks each adapted for holding a quantity of articles, a table adapted for having said plurality of racks removably mounted thereon, an inclined track defining a path of movement for said articles, said track having its upper end adjacent said table and a delivery location removed from the upper end, driving means for moving said table and passing said racks in sequence adjacent the upper end of the track, latch means for preventing movement of said table when one of said racks is in position adjacent the upper end of said track, unloading means for moving articles in sequence off the one rack and onto the inclined track, an escapement means associated with said track intermediate said upper end and said delivery location for alternately blocking said path and releasing a single article at a time to pass to the delivery location, a detecting means located intermediate said upper end and said escapement means for periodically determining the presence of more or less than a predetermined number of articles located on said track between said escapement means and said detecting means and for producing a signal when less than the predetermined number of articles is detected, and actuating means responsive to said signal for momentarily deactivating said latch means and permitting said driving means to move said table and pass another rack into position adjacent the upper end of the track whereupon said latch means prevents further movement of said table.

3. Apparatus for holding small, fragile articles in a plurality of batch arrangements and for presenting one article at a time at a delivery location for loading into one of a series of receptacles which are presented in sequence at the delivery location, said apparatus including a plurality of racks for holding said articles, each of said racks having a supporting surface for supporting said articles and an opening in said surface extending along the length of the rack for permitting a portion of each of said articles to extend below said surface while said articles are being supported in a line by said surface, a rotary table adapted for having said plurality of racks removably mounted thereon, an inclined track defining a path of movement for said articles and having an upper end and a delivery location removed from the upper end, said track having a supporting surface for supporting articles thereon and an opening in the surface along the length of the track whereby articles placed at the upper end of the track are supported by the surface and move freely in a line under the force of gravity along the track toward the delivery location, a driving means including a slip clutch for rotating said table and passing said racks in sequence adjacent the upper end of the track, latch means for stopping rotation of said table and causing said clutch to slip when one of said racks is in position adjacent the upper end of the track with the opening in the surface of the one rack in register with the opening in the surface of the track, unloading means for directing a steady stream of air against the portion of each of the articles extending above the surface of the one rack and for directing an intermittent stream of air against the portion of each of the articles extending below the surface of the one rack, both of said streams of air being directed along the length of the one rack and toward the upper end of the track whereby articles supported by said one rack are unloaded onto said inclined track, an escapement mechanism arranged across said track intermediate the upper end of said track and said delivery location for blocking said path of movement of said articles along said track and for permitting only one article to be presented at said delivery location for each activation of said escapement mechanism, an escapement actuating means for activating said escapement mechanism for loading one article into each of a series of receptacles presented in sequence at the delivery location, a sensing unit located intermediate said upper end and said escapement mechanism for periodically determining whether or not the number of articles blocked by said escapement mechanism extends along the track to a particular point on said detector and for producing a signal when articles are not detected on the track at said point, and latch actuating means responsive to said signal for momentarily retracting said latch means and permitting said driving means to rotate said table through said slip clutch and pass another of said racks adjacent the upper end of said track, whereupon said latch means stops rotation of said table and causes said clutch to slip when the other of said racks is in position adjacent the upper end of the track with the opening in the surface of the other rack in register with the opening in the surface of the track.

4. Apparatus for moving a plurality of articles along a path of movement in single file including a conveying member having a surface for supporting said articles, said surface having an opening therein extending along the path of movement and defining a channel for permitting a portion of each of said articles to extend below said surface and for maintaining said articles in single file, means for directing a steady stream of air against the portion of the last article in the file extending above said surface, and means for simultaneously directing an intermittent stream of air against the portion of said last article extending below said surface.

References Cited in the file of this patent

UNITED STATES PATENTS

| | | |
|---|---|---|
| 1,308,464 | Westly | July 1, 1919 |
| 2,078,694 | Smith | Apr. 27, 1937 |
| 2,342,680 | Melzer | Feb. 29, 1944 |
| 2,734,657 | Drese | Feb. 14, 1956 |
| 2,764,800 | Harwood | Oct. 2, 1956 |
| 2,832,462 | Simer | Apr. 29, 1958 |
| 2,849,068 | Frank et al. | Aug. 26, 1958 |